United States Patent [19]
Brenneke

[11] 3,811,692
[45] May 21, 1974

[54] PLASTICS FILLED PISTON RING

[75] Inventor: Arthur M. Brenneke, New Castle, Ind.

[73] Assignee: TRW Inc., Cleveland, Ohio

[22] Filed: May 30, 1972

[21] Appl. No.: 258,061

Related U.S. Application Data

[63] Continuation-in-part of Ser. No. 50,677, June 29, 1970, Pat. No. 3,697,090.

[52] U.S. Cl.................. 277/231, 277/228, 277/223
[51] Int. Cl............................................. F16j 15/16
[58] Field of Search ........... 277/231, 223, 228, 224, 277/DIG. 6

[56] References Cited
UNITED STATES PATENTS
3,697,090 10/1972 Brenneke............................ 277/228

Primary Examiner—Samuel B. Rothberg
Attorney, Agent, or Firm—Hill, Gross, Simpson, Van Santen, Steadman, Chiara & Simpson

[57] ABSTRACT

A composite metal and plastics piston ring having a controlled operative load-deflection ratio. The piston ring is composed of a circumferentially expansible and contractible channel-type metal ring component and an elastomeric plastics material ring component anchored to and supported by the metal ring. The plastics material ring component has a peripheral wall and side walls with at least one side wall having integral ribs projecting therefrom into the gaps between the segments of the metal ring component and the ribs being spaced from the segments in the expanded free condition of the composite ring but engaging the segments to seal the gaps in the contracted, use condition of the composite ring. The composite piston ring is formed by compacting an elastomeric plastics material in a segmented circumferentially expansible and contractible channel-type metal ring component in its expanded, free condition to form a continuous plastics material ring component therein, contracting the compacted plastics-filled metal ring to its use condition to form ribs of the plastics material in the gaps between the segments of the metal ring component, and heating the compacted plastics-filled metal ring in its expanded, free condition to sinter the plastics material ring therein in an integrally bonded relation to the metal ring providing a composite metal and plastics piston ring.

6 Claims, 12 Drawing Figures

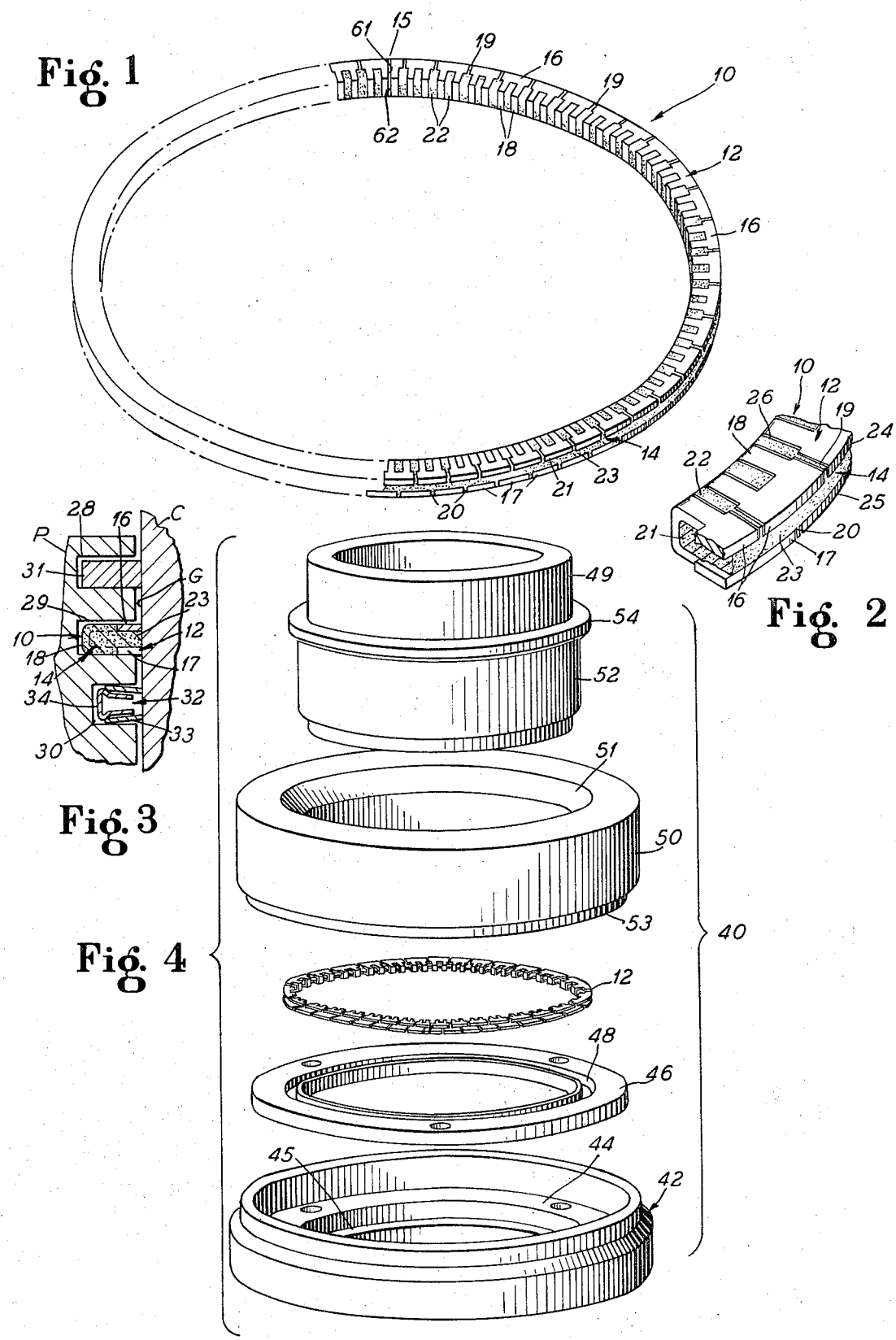

PLASTICS FILLED PISTON RING

RELATED APPLICATIONS

This application is a continuation-in-part of the Arthur M. Brenneke U.S. Pat. application, Ser. No. 50,677, filed June 29, 1970, now U.S. Pat. No. 3,697,090, issued Oct. 10, 1972, entitled "Plastics-Filled Piston Ring."

BACKGROUND OF THE INVENTION

1. Field of the Invention

This invention relates to the art of making packings or piston rings having an elastomeric plastic sealing ring anchored to and supported by a segmented circumferentially expansible metal ring. More particularly, the invention relates to a process where an elastomeric plastic material is compacted in an expansible metal ring and sintered to form a composite metal and plastics piston ring having a peripheral sealing surface conforming with and riding on the cylinder wall in which the piston operates.

2. Description of the Prior Art

The segmented circumferentially expansible metal rings such as disclosed and described in the Bowers U.S. Pat. No. 2,224,338 have been limited for use as oil control rings or oil scraping rings in engine piston and cylinder assemblies because they are incapable of sealing against the pressures that exist at the compression ring area of the piston. Sealing of the gaps in such rings with plastic material has been disclosed in the Knocke U.S. Pat. No. 3,053,545, but such gap sealed rings do not provide a plastic sealing face riding on a cylinder wall and are not intended for use as compression rings.

SUMMARY OF THE INVENTION

According to this invention there is provided a composite metal and plastics piston ring useful as a second compression ring in an internal combustion engine piston and cylinder assembly which comprises an elastomeric plastics material ring component integrally anchored to a circumferentially expansible and contractible metal ring component having circumferentially separated segments. The plastics material ring component has a peripheral wall and side walls with at least one side wall having integral ribs projecting therefrom into the gaps between the segments of the metal ring and the ribs being spaced from the segments in the expanded free condition of the composite ring but engaging the segments to seal the gaps in the contracted use condition of the composite ring, whereby the metal ring component may contract from an expanded free condition to a contracted, use condition without interference from plastics material between the segments. The compression rings produced by the method of this invention have a controlled operative load-deflection ratio to be used satisfactorily in an internal combustion engine. The compression rings present a peripheral band of elastomeric plastic to the cylinder wall forming a conformable sealing face. The elastomeric material is supported by and anchored to a metal ring which will not interfere with the conforming of the plastic to the cylinder wall and at the same time will circumferentially expand the periphery of the plastics ring into a good sealing contact with the cylinder wall. The metal prevents extrusion of the plastics material under the high compression loads existing in the gap between the piston and the cylinder in high compression engines.

The piston rings produced by the method of this invention present a continuous sealing band surface of elastomer to the cylinder wall. This surface has a low coefficient of friction, adapts itself to any cylinder irregularities so that a wear-in or break-in period of engine operation is not necessary. The segmented circumferentially expansible metal ring exerts a radial expansion force on the plastics ring pressing it against a cylinder wall with the desired sealing load and in addition firmly supports the plastics material so that it will not be deformed into any gap between the piston and cylinder and so that it will not deform in the piston groove. The periphery of the metal ring also engages the cylinder wall with the plastics ring to cooperate therewith in forming the seal, and since this ring is segmented it, too, will readily conform with the cylinder wall.

A composite metal and plastics piston ring is formed according to the present invention by the method which comprises: placing a circumferentially expansible and contractible metal ring component having separated segments in a mold sized to circumferentially hold the ring in its expanded free condition; filling the mold cavity having the metal ring therein with a moldable plastics material and forcing the plastics material into the mold cavity to fill all the voids of the metal ring; compacting the plastics material in the metal ring under a sufficiently high pressure to form the plastics material into a self-sustaining continuous ring; contracting the compacted plastics-filled metal ring to its use condition to form ribs of the plastics material projecting therefrom into the gaps between the segments and expanding the compacted plastics-filled metal ring to its free condition; and heating the compacted plastics-filled metal ring in its free condition to sinter the plastics material providing a composite metal and plastics piston ring having a controlled operative load-deflection ratio.

It is therefore, an object of this invention to provide a method for making an integrated plastics metal piston ring having a controlled operative load-deflection ratio and being suitable for a compression ring in an internal combustion engine piston and cylinder assembly.

Another object of this invention is to provide a method of making a fluorocarbon plastics-filled segmented circumferentially expansible channel type metal piston ring having a controlled operative load-deflection ratio.

A still further object of this invention is to provide a method of manufacturing an elastomer plastics ring encased in a segmented circumferentially expansible metal piston ring.

Other and further objects of this invention will become apparent to those skilled in this art from the following detailed description of the annexed sheets of drawings in which, by way of examples only, illustrate the preferred embodiments of the present invention.

BRIEF DESCRIPTION OF THE DRAWINGS

FIG. 1 is a perspective view of a compression piston ring made by the method of this invention, illustrating the piston ring in its free, radially uncompressed size;

FIG. 2 is an enlarged cross-sectional fragmentary perspective view of the ring of FIG. 1, illustrating the filling of all voids of the metal ring with the plastics material and the ribs of plastics material projecting into the gaps between the segments of the metal ring component;

FIG. 3 is a fragmentary cross sectional view of a piston and cylinder assembly having the ring of FIGS. 1 and 2 mounted in the second ring groove to provide a compression ring;

FIG. 4 is an exploded view of the component parts of a molding apparatus for making a compacted plastics-filled metal compression piston ring according to the present invention;

DESCRIPTION OF THE PREFERRED EMBODIMENTS

Figure 5A:
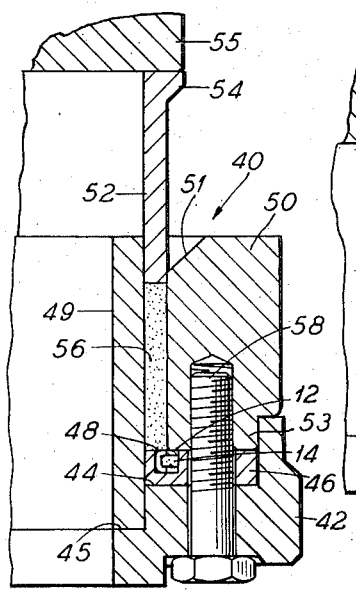
FIG. 5A is a fragmentary cross-sectional view of the assembled component parts of the apparatus of FIG. 4, illustrating the arrangement of the component parts thereof at the beginning of the downward stroke of the punch.

Referring to FIGS. 1 and 2, there is illustrated a composite piston ring 10 formed by the process of the present invention. As shown, the composite piston ring 10 includes a sheet steel segmented circumferentially expansible and contractible channel-type ring 12 of the type shown, for example in the aforesaid Bowers U.S. Pat. No. 2,224,338 and an elastomeric plastics material ring 14 encased by the ring 12 and filling all voids of the metal ring 12. The ring 10 is split at 15 and in operation has its split ends 61 and 62 abutted together.

The ring portion 12 has a top row of circumferentially separated radially extending ring segments 16 and a bottom row of similar segments 17 connected in parallel axially spaced relation by circumferentially spaced axially extending legs 18 around the inner periphery of the ring. Each segment 16 and 17 has two legs 18 with each leg extending from a segment in one row to an adjacent segment in the other row. The segments in the two rows are thereby in staggered relation to each other, and the radial gaps 19 between the segments 16 of the top row are thus circumferentially offset from the gaps 20 between the segments 17 in the bottom row.

The ring 12 has an outwardly opening channel 21 and spaces or gaps 22 between the legs 18 expose this channel to the interior of the ring.

The channel 21 and the spaces or voids 22, as well as the gaps 19 and 20 are filled with the elastomeric plastics ring 14 and, as shown in FIGS. 2 and 3, this ring presents a cylindrical peripheral sealing face 23 between peripheral edges 24 and 25 provided by the segments 16 and 17.

The plastics ring face 23 is flush with edges 24 and 25 and, as shown in FIG. 2, the plastics ring 14 fills in the voids 22 and gaps 19 and 20 and has integral fins or ribs 26 projecting therefrom into the gaps and voids. The ribs 26 project from both of the side walls of the plastics ring 14 and are spaced from the segments 16 and 17 when the composite ring 10 is in its expanded free condition. However, when the composite ring is in its contracted, use condition, the ribs 26 engage the segments to seal the gaps and voids. Accordingly, the metal ring component 12 can contract from an expanded free condition to a contracted, use condition without any interference from plastics material between the segments 16, 17.

The ring 14 is thus encased in the ring 12 and has a fully exposed outer peripheral face 23 forming the sealing surface in the piston and engine assembly shown in FIG. 3 where the piston P rides in the bore of a cylinder C and has a top compression ring groove 28, a second compression ring groove 29 and an oil ring groove 30. A conventional split cast iron compression ring 31 is seated in the top groove 28, the ring 10 of this invention is seated in the groove 29 and a conventional oil ring assembly 32 is provided in the oil groove 30. The assembly 32 includes thin rail rings 33 supported on a spacer-expander ring 34.

The ring 10 in the second compression ring groove 29 of piston P is subjected to higher temperatures and greater pressures than the oil ring 32 in the ring groove 30 and the plastics component 14 of this ring 10 is fully protected against deformation or extrusion either from the gap between the piston and the cylinder or in the ring groove by the metal ring component 12. The top and bottom ring segments 16 and 17 of this component 12 bridge the gap G between the piston and the cylinder and thus protect the plastics ring 14 against deformation in this space. Likewise, these segments 16 and 17 and the backup legs 18 of the ring component 12 prevent deformation of the plastics ring component 14 in the ring groove 29. The ring 10, of course, has its split ends 61 and 62 abutted together and is contracted in its operative position in the piston and cylinder assembly so that the metal component 12 of the ring exerts circumferential expansion force on the plastics ring component 14, urging the peripheral face 23 thereof into good sealing contact with the cylinder wall. Since both the metal component 12 and the plastics component 14 of the ring 10 are flexible, the sealing face 23 readily adapts to the contour of the cylinder bore and an effective seal is established without a break in period of operation. In general, the plastics material of the ring component 14 must be capable of resisting temperatures that exist of 450° F. without softening or in any way losing its sealing integrity. Since the plastics ring is encased by the metal ring, it will of course resist very high blowby pressures.

In addition, the elastomeric plastics material should have a low coefficient of friction and be resistant to oil and engine temperatures and corrosion conditions prevailing in the engine. The plastics material is preferably filled and compacted in all voids of the segments circumferentially expansible channel-type metal ring 12 and is integrally secured to the metal by a sintering process as described below.

According to the present invention any elastomeric plastics material capable of maintaining its integrity under all engine operating conditions may be used including polyolefinic polymers, preferably fluorocarbons, such as tetrafluoroethylene ("Teflon"), chlorotrifluoroethylene (Kel-f), vinylidene fluoride, hexafluoropropylene, and vinly fluoride, polyamides such as nylon, silicones such as "Silastic" (Dow Chemical Corporation), and the like.

According to the present invention there is provided a composite metal and plastics piston ring having a controlled operative load-deflection ratio. The metal and plastics piston ring has an adequate but not excessive load-deflection ratio under the operating conditions in a piston and cylinder assembly of an internal combustion engine.

Figure 5B:
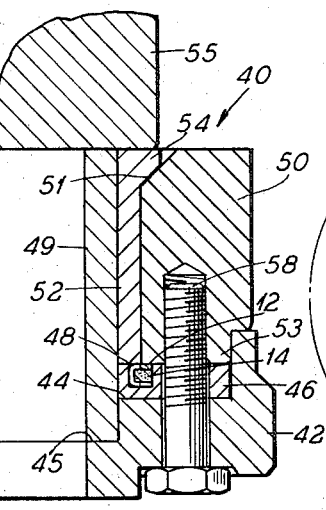
FIG. 5B is a fragmentary cross-sectional view similar to that of FIG. 5A, illustrating the punch at the end of its downward stroke and the plastics material compacted in the metal ring.
Figure 6:
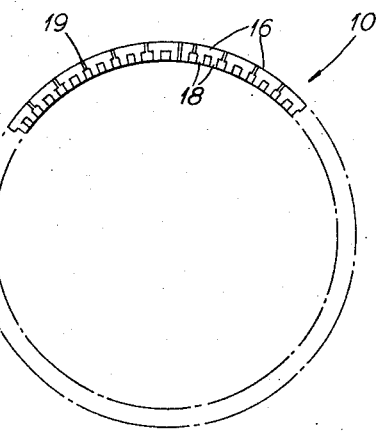
FIG. 6 is a plan view of the compacted plastics-filled metal ring made in the apparatus of FIGS. 4 and 5 illustrating the continuous plastics material ring component within the metal ring component.

The composite metal and plastic piston rings of this invention may be made in a molding apparatus illustrated in FIGS. 4, 5a, and 5b. As there shown, a molding apparatus 40 capable of withstanding high pressures and stresses provides a recess for receiving the metal component 12 of the ring in a free state condition. Powdered or granular plastics material such as "Teflon" is forced into the mold cavity of the apparatus to fill all of the voids.

The illustrated apparatus 40 has a base 42 with an annular recess 44 providing a seat for a mold fixture ring 46 which has a top annular groove of a width sufficient to receive the metal ring component 12 and hold it in its free uncompressed state as shown in FIG. 4. A mold cover ring 50 overlies the base 42 and has a pilot portion 53 extending into the recess of the base to seat on the fixture 46. The cover ring 50 leaves uncovered a portion of the annular groove 48 in the fixture 46.

A cylindrical collar 49 is mounted inside of the cover ring 50 and held in spaced concentric relation from the inner periphery of the cover ring by a seat 45 provided in the base plate 42. An annular groove 56 is thus provided between the ring 50 and the collar 49 communicating at its bottom with the inner periphery of the annular groove 48 in the fixture ring 46.

A cylindrical punch 52 slidably fits the annular groove 56 and is actuated by a ram 55 to force powdered or granular plastics material in the groove 56 into the groove 48 of the fixture ring 46.

The punch 52 has a tapered external shoulder 54 adapted to bottom on the tapered shoulder 51 of the cover ring 50.

A plurality of bolts 58 extend through the base plate 40 and through holes in the mold fixture 46 and are threaded into the cover ring 50 to clamp the mold fixture 46 between the base and cover rings.

A sufficient amount of powdered or granular plastics material to fill the mold cavity 48 in a fully compacted condition is placed in the annular groove 56 and the punch 52 then forces the powdered or granular plastics material into the groove 48 compacting the plastics into the channel 21 of the ring component 12 as well as into the gaps 22 between the legs and the radial gaps 19 and 20 between the segments 16 and 17 of this metal ring component. The compacting pressure greatly reduces the volume of the granular plastics material with a reduction of from 3 to 1, or 4 to 1 in volume. This compacting of the plastics material forms it into a self-sustaining ring component 14 within the metal ring component 12. The metal ring component 12 is split as initially formed, but the plastics component is a continuous ring.

The plastics filled ring 10 is in its free state condition, and the plastics material is in a self-sustaining condition encased in the metal ring.

The ring 10 produced in the molding apparatus 40 is next circumferentially contracted to its use size or closed working condition to form the ribs 26 of the plastics material in the gaps and voids of the metal ring so that when the contracting force is released, the metal ring will slide on the plastics material and can be expanded to its free condition. The ring, in its free state, is next heated in a furnace to sinter the plastics material forming the plastics component into an integrated ring.

Figure 7:
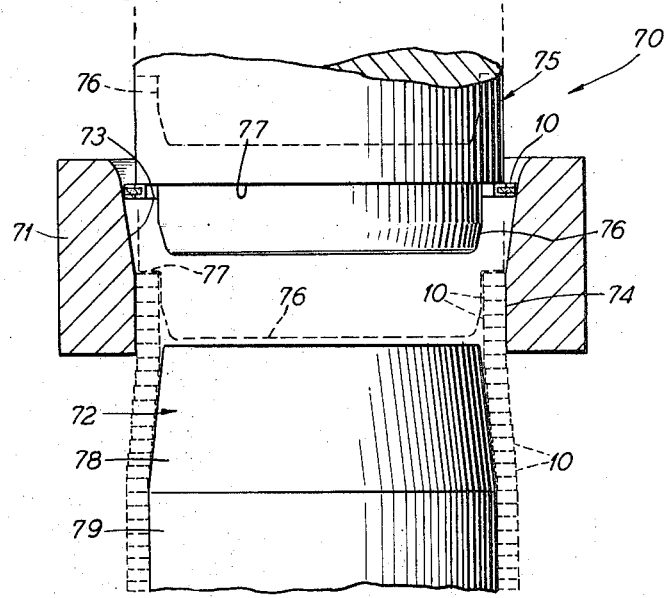
FIG. 7 is a partial cross-sectional view of an apparatus for contracting the plastics-filled metal ring of FIG. 6 to its use condition, for expanding the ring to its free condition, and for sintering the plastics material compacted in the ring.

FIG. 7 illustrates an apparatus 70 adapted for receiving rings from the molding apparatus 40 to contract the ring to their closed use size and to then permit their expansion onto an arbor for the sintering step. As shown in FIG. 7, a die ring 71 is positioned above an arbor 72. The ring 71 has a tapered bore 73 converging from a flared out mouth on the top of the ring to a cylindrical bore 74 of the same diameter as the cylinder in which the rings are to be used in operation.

A plunger 75 has a leading pilot portion 76 adapted to receive rings 10 freely therearound. A shoulder 77 overlies these rings, and as the plunger is advanced into the tapered bore 73 of the die rings 71, one or more rings 10 around the pilot portion 76 thereof will be pushed by the shoulder 77 downwardly through the die ring to contract to the diameter of the cylindrical bore 74. This squeezes out the plastics material between the contracting gaps of the metal ring component 12 with the squeezed out material forming a flash extrusion on the side faces of the metal ring component.

The plunger 75 forces the rings 10 through the bottom of the die ring 71 onto the tapered nose 78 of the arbor 72 which may be hollow to receive the pilot portion 76 of the punch so that the shoulder 77 thereof can advance the ring over the nose 78 to the full diameter portion 79 of the arbor. This portion 79 has a diameter sized to the inside diameter of the free state or use condition of the rings 10.

When the arbor 72 is filled with a stack of rings 10 in their expanded free size condition around the portion 79 thereof, the assembly is placed in an electric furnace (not shown) and heated to a sufficiently high temperature to sinter the plastics material into an integrated body bonded with the metal ring component.

The plastics-filled metal rings 10 are heated to temperatures which do not exceed the temperatures at which the metal component 12 of the ring has been subjected in previous tempering treatment. For example, if the ring component 12 is composed of standard piston ring steel, such as S.A.E. 1,095, and has been subjected to a tempering treatment at 650° to 700° F., the plastics packed ring may be heated up to this temperature range. When the plastics component is "Tef- Ion" a sintering of the packed material will occur at temperatures ranging from about 650° to about 750° F. With any of the plastics material that may be used, the sintering operation should take place at least at a temperature above the temperature at which the plastics material will permanently fuse. Accordingly, the sintering temperature can range between about 650° and about 750° F.

In making the piston rings 10 according to the present invention, there are integral ribs 26 of the plastics materials formed which project from the plastics ring component 14 into the voids and gaps of the metal ring 12 and between the segments 16, 17 thereof. The ribs 26 are initially formed in the gaps and voids when the plastics material is compacted under a high pressure in the metal ring. Then, when the compacted plastics-filled ring is contracted from its free condition to its compressed, working condition, for example, as described above in the ring contracting and expanding device 70, the segments 16, 17 are moved closer together and in effect extrude or remove some of the plastics material formed in between the segments. By this extruding action, the ribs are made smaller or more narrow and when the compacted plastics-filled ring is expanded or allowed to expand to its expanded free condition, the metal ring slides on the plastics material and there are gaps or spaces between the ribs 26 and the segments 16, 17. Accordingly, when the composite ring 10 is contracted to its use condition, the ribs engage the segments to seal these gaps or spaces. Thus, the metal ring component may be contracted from a free condition to a use condition without any interference from the plastics material in between the segments.

Figure 8:
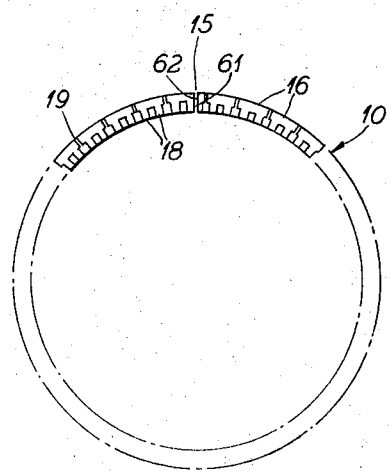
FIG. 8 s a plan view of a composite sintered plastics-filled metal compression piston ring provided by the apparatus of FIG. 7 illustrating the plastics material ring component cut at the abutting ends of the metal ring component.

After the ribs 26 have been formed in the voids of the metal ring and the compacted plastics-filled ring sintered, the resultant ring 10, as shown in FIG. 8, is finished and its edges and surfaces are smoothed by, for example, a machining process. Then, the plastics material ring 14 is slit at 15 between the abutting ends 61 and 62 of the encasing metal ring 12. Accordingly, the portions of plastics material that may have formed irregular surfaces on the plastics ring 14 or adhered to the outer metal ring 12 surface when the ribs 26 were formed, are smoothed down or removed by the finishing process.

According to the present method, a composite metal and plastics piston ring is provided which has a controlled operative load-deflection ratio. To make such a compression piston ring, I have found that it is necessary to fill and compact the powdered plastics material in the segmented circumferentially expansible metal ring 12 with the ring confined to its free uncompressed diameter, to contract the compacted plastics-filled ring to its compressed, use diameter and to sinter the plastics material in the metal ring when it is expanded to its expansive free diameter around a plug having a corresponding diameter. By performing these operations with the metal ring 12 in these respective conditions, a composite metal and plastics piston ring is provided which has a controlled operative load-deflection ratio but yet an adequate working deflection.

In constructing the present piston ring, it is also important that the resultant piston ring not lose its tension so that it will return to its original free diameter after it is taken out of the cylinder. Accordingly, the structure and form of the composite plastics material 14 and the segmented circumferentially expansible channel-shaped steel ring 12 should be such that the steel ring 12 has a sufficient expansive force to overcome the plastics material after it has fused, by heat, to the cylinder diameter (i.e., approximately the radially compressed diameter of the metal ring) and force the piston ring back to its original free diameter when it is taken out of the cylinder. It is necessary that the steel ring 12 have an adequate expansive force to exert on the plastics ring component 14 in order to urge the peripheral face 23 thereof into a good sealing contact with the cylinder wall, as illustrated in FIG. 3.

Figure 11:
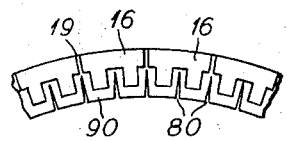
FIG. 11 is an enlarged fragmentary plan view of a compression piston ring having an inward extension of plastics material formed on the internal diameter (I.D.) of the ring.
Figure 9:
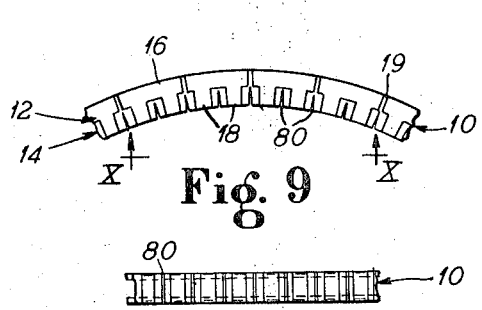
FIG. 9 is an enlarged fragmentary plan view of the compression piston ring of FIG. 8 showing the radial cuts on the internal diameter (I.D.) of the plastics material ring component.
Figure 10:
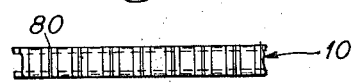
FIG. 10 is a view taken along line X—X of FIG. 9.

In the cases in which the piston ring may lose some of its tension and the steel ring 12 lacks sufficient expansive force, these can occur due to an inward extension 90 of the plastics material formed on the internal diameter (I.D.) of the steel ring 12, as shown in FIG. 11. In such instances, the continuity of the plastics material may be interrupted by making radial cuts 80 in the internal diameter of the elastomeric plastics material ring 14 which extend to the metal ring 12, as illustrated in FIGS. 9 and 11. It has been found that by making these radial cuts 80 in the internal diameter (I.D.) of the plastics material ring 14, the loss of tension and original free diameter of the ring 10 induced by lack of expansive force of the steel ring 12, are restored. Since the radial cuts are solidly closed when the piston ring 10 is in the engine, they do not impair any functional value of the internal diameter (I.D.) of the plastics material ring 14 but do restore important properties of the resultant piston ring 10.

According to the present invention, it is thus preferred not to have any plastics material formed on the internal diameter (I.D.) of the metal ring 12 as shown in FIG. 9. Thus, in order to avoid as much as possible the formation of plastics material on the internal diameter (I.D.) of the metal ring, the mold cavity 48 of the mold fixture 46 should be of the size to hold the metal ring snugly without contracting it as shown in FIG. 5. With this mold size, the formation of plastics material, if any, should be only a minimum on the internal diameter (I.D.) of the metal ring 12.

In the piston ring 10 provided by the present invention the metal ring component 12 is circumferentially expansible and loads the plastics ring component 14 to cause it to conform with the cylinder wall in good sealing engagement. The metal ring component also protects the plastics ring component against deformation and extrusion.

I claim as my invention:

1. A composite metal and plastics circumferentially expansible piston ring having a controlled load-deflection ratio which comprises a circumferentially expansible and contractible metal ring component having circumferentially separated segments, an elastomeric plastics material ring component anchored to the metal ring component and having a peripheral wall and side walls, at least one side wall having integral ribs projecting therefrom into the gaps between the segments of the metal ring component and said ribs being spaced from the segments in the expanded free condition of the composite ring but engaging said segments to seal the gaps in the contracted, use condition of the composite ring whereby the metal ring component may contract from an expanded, free condition to a contracted, use condition without interference from plastics material between the segments.

2. A composite piston ring according to claim 1 wherein the peripheral wall of the plastics ring component has a sealing surface resiliently loaded by the expansive force of said metal ring to conform with and ride on a cylinder wall.

3. A composite piston ring according to claim 1, wherein said elastomeric plastics ring component has spaced, radial cuts in its internal diameter.

4. A composite piston ring according to claim 3, wherein said radial cuts in said plastics ring component extend from the internal diameter thereof to the metal ring.

5. A composite piston ring according to claim 1 wherein the plastics material is selected from a group of fluorocarbons consisting of tetrafluoroethylene, chlorotrifluoroethylene, vinylidene fluoride, hexafluoropropylene and vinyl fluoride.

6. A composite plastics-filled compression piston ring having a controlled operative load-deflection ratio which comprises a one-piece radially opening channel-shaped circumferentially expansible and contractible metal ring component having circumferentially separated segments, an elastomeric plastics material ring component integrally anchored to the metal ring component and having a peripheral wall with a sealing surface for riding on a cylinder wall in a piston and cylinder assembly, and said plastics ring component having side walls with at least one side wall having integral ribs projecting therefrom into the gaps between the segments of the metal ring component and said ribs being spaced from the segments in the expanded free condition of the composite ring but engaging said segments to seal the gaps in the contracted use condition of composite ring whereby the metal ring component may contract from an expanded free condition to a contracted use condition without interference from plastics material between the segments.

* * * * *